A. DENISON
Apparatus for Gathering Potato-Bugs.
No. 206,776. Patented Aug. 6, 1878.
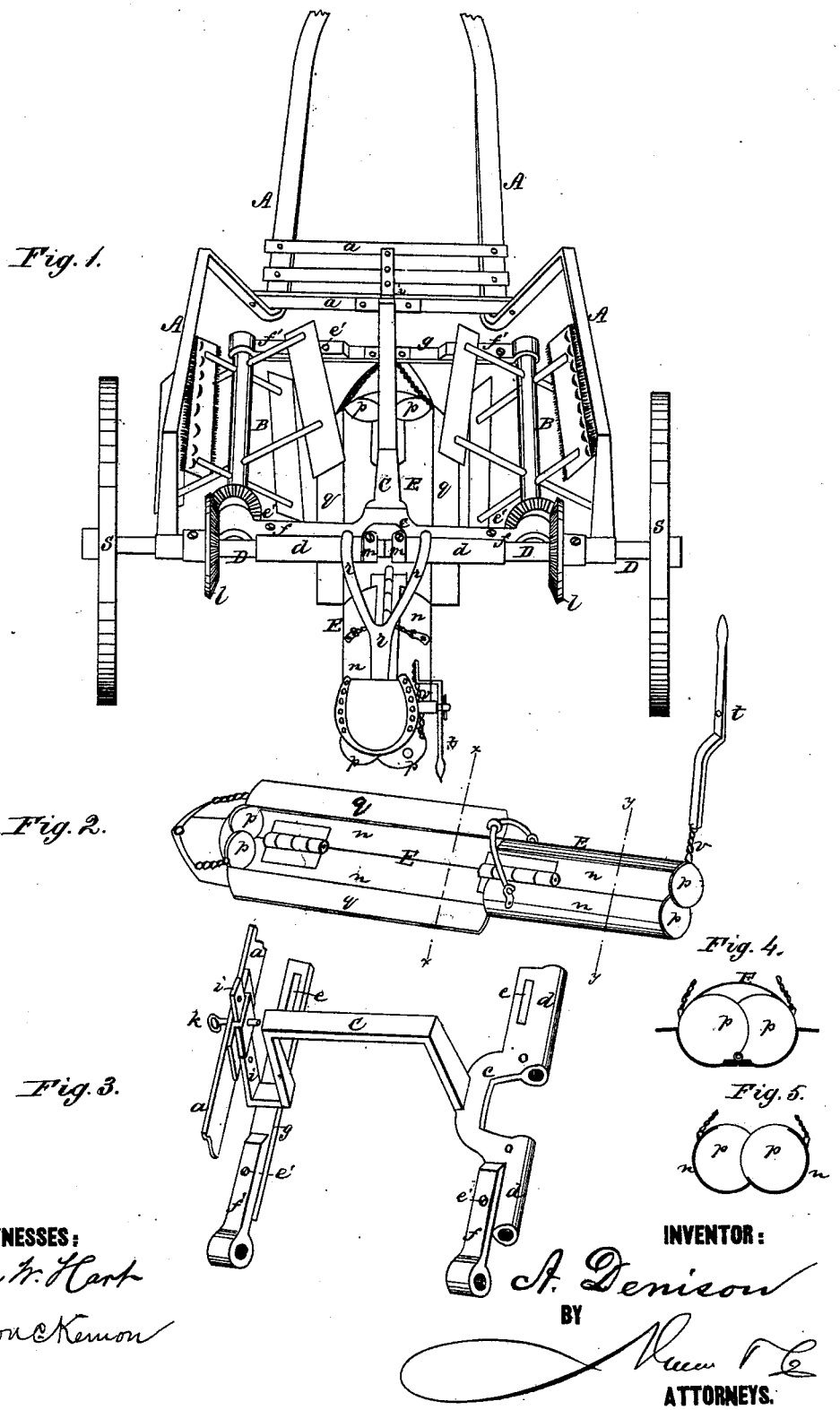

UNITED STATES PATENT OFFICE.

ALBERT DENISON, OF STILLWATER, NEW YORK.

IMPROVEMENT IN APPARATUS FOR GATHERING POTATO-BUGS.

Specification forming part of Letters Patent No. 206,776, dated August 6, 1878; application filed April 4, 1878.

*To all whom it may concern:*

Be it known that I, ALBERT DENISON, of Stillwater, in the county of Saratoga and State of New York, have invented a new and Improved Machine for Gathering Potato-Bugs; and I do hereby declare that the following is a full, clear, and exact description of the same.

My invention is an improvement in the class of machines for sweeping or removing vermin or bugs from plants, more especially from potato-vines, and gathering them into a suitable receptacle, from which they can be removed and destroyed at will.

The invention consists chiefly in the construction and arrangement of parts whereby I produce a machine capable of adjustment to adapt it to operate on plants or vines standing in rows located at different distances apart.

In the accompanying drawing, Figure 1 is a perspective plan view of my improved machine. Fig. 2 is a perspective plan view of the receptacle into which the bugs are gathered. Fig. 3 is a perspective view of the central frame of the machine, having certain parts attached thereto. Figs. 4 and 5 are cross-sections of the vermin-receptacle on lines $x\ x$ and $y\ y$, respectively, of Fig. 2.

The shafts A A of the machine are rigidly connected by cross-bars $a$ and bent or arched upward to accommodate the revolving sweeps B. The frame C has a like arch, which is equidistant between the arches of the shafts A. The rear portion of the frame is a transverse bar, $c$, having tubular ends $d$, which form the bearings of the two separate axles D, and are also provided with slots $e$ to receive the screw-bolts $e'$ that adjustably attach the lateral arms $f$ thereto.

A horizontal bar, $g$, forms the front portion of the frame C, and is also provided with slots $e$ for adjustable attachment of lateral arms $f'$. The shafts of the two revolving sweeps B B have their bearings in eyes or sockets formed in the outer ends of said arms $f\ f'$, and are arranged parallel or nearly so to the general direction in which the machine moves. The part $i$ of the frame C is bent upward from bar $g$, and passes through a keeper attached to the shaft-connecting bars $a$. The said vertical bar $i$ is perforated to receive a pin, $k$, so that it may be secured in any adjustment. The purpose of the adjustment is to raise or lower the sweep B and receptacle E.

The sweeps are constructed of a series of bars affixed to arms radiating from the shafts, and have suitable brushes attached. The sweeps are revolved by bevel-gears $l$ and placed on the axles D, and secured by clamp-screws to render them adjustable thereon.

As shown in Fig. 1, the inner ends of the axles are in contact, and the sweeps B B are as near each other as practicable, which is the relation the sweeps occupy when the machine is used for gathering bugs from rows of plants or vines that are but a short distance apart. When the rows are farther apart the arms $f\ f'$ are adjusted, by means of the slots and bolts $e'$, to place the sweeps B B farther apart. At the same time the bevel-gears $l$ are also necessarily adjusted along the axles a corresponding distance.

The axles D are secured in the journal-bearings $d\ d$ by means of collars $m$ having clamp-screws, said collars being applied to the inner ends of the axles, as shown in Fig. 1. The bugs are gathered by the revolving sweeps B into the receptacle E, which consists, essentially, of two hollow semi-cylindrical portions, $n\ n$, hinged together at the lower edge and each having a circular plate or disk, $p$, forming its end. The front end of the receptacle E is conical, and a portion of the sides of the parts $n\ n$ are bent or flared outward, as shown at $q$ in Fig. 2. The receptacle is suspended by chains from the front bar $g$ of frame C and from the arm $r$ that supports the driver's seat, so that it swings free beneath the axle and equidistant between the sweeps B B.

In using the machine it is placed to run, with the receptacle E, between two rows of plants or vines, and the wheels $s$ outside of said rows. In such case the flared portions or wings $n$ of the receptacle extend close to the plants or vines, and underneath the pendent leaves or branches thereof, so that as the machine advances, and the sweeps B are caused to revolve, they will brush the bugs from the vines onto the wings $n$ and lodge them in the body of the receptacle E. If the sweeps or the receptacle, or both, are too low for effective work, the pin $k$ and perforated bar $i$ enable them to be secured at a different height. The rear end of the receptacle may be adjusted or raised by a lever, *t*, and chain *v* to enable it to pass easily over large stones or other obstructions. On the other hand, if the rows of plants or vines are so far apart that the sweeps do not act efficiently, the latter are moved laterally by adjusting-arms *f f'* until they are the required distance apart.

The bugs swept into the receptacle will enter the rear end thereof, whence they may be removed and destroyed at will.

What I claim is—

1. In a machine for gathering bugs from plants or vines, the combination of the revolving sweeps having laterally-adjustable bearings *f f'*, and the laterally-adjustable gears *l*, the axles D, and a frame composed of bars C *c g* connecting said axles and having the sweep-bearings attached thereto, all as shown and described.

2. In a machine for gathering bugs from plants or vines, the tubular receptacle E, formed of two semi-cylindrical parts, *n n*, each provided with a lateral wing and circular end, *p*, as specified.

ALBERT DENISON.

Witnesses:
L. VAN DEMARK,
A. D. TUCKER.